Aug. 13, 1974     E. HOLZ     3,829,360
ROLLER HAVING A CYLINDRICAL SURFACE OF FLAT
BELTS AND CORRUGATED BELTS

Filed Sept. 26, 1972     3 Sheets-Sheet 2

United States Patent Office 3,829,360
Patented Aug. 13, 1974

3,829,360
ROLLER HAVING A CYLINDRICAL SURFACE OF FLAT BELTS AND CORRUGATED BELTS
Emil Holz, Eningen, Germany, assignor to Herman Finckh Metalltuch-und Maschinenfabrik, Reutlingen, Wurttemberg, Germany
Filed Sept. 26, 1972, Ser. No. 292,349
Claims priority, application Germany, Sept. 28, 1971, P 21 48 361.4
Int. Cl. D21f 1/60
U.S. Cl. 162—357          6 Claims

ABSTRACT OF THE DISCLOSURE

A roller, particularly for use in paper making machines, and providing flow-through openings between the body of the roller and a woven cover enclosing the body. The body is of cylindrical configuration and has peripherally disposed flat belts which are connected together by belts that are corrugated in the peripheral direction. The flow-through openings are provided at the connecting points between the flat and corrugated belts.

BACKGROUND OF THE INVENTION

The present invention relates to a roller, particularly for machines used in the paper making industry, which has a roller body of flat belts extending at least approximately in the peripheral direction and being disposed on edge in the radial direction. These belts are connected together by other belts which are corrugated in the peripheral direction and are also arranged on edge in the radical direction. A woven covering is disposed on these belts.

Such rollers are used in the paper making industry and particularly as draining rollers. However, they are also suited for circular sieve cylinders, register rollers or for use in other machines in the paper making industry, as well as in industry in general. In the case of rollers which are to be used in the paper making industry it is particularly important that, in addition to having an accurate cylindrical configuration and precise circular movement, the rollers function so as to prevent marks and wash-outs on the wet paper panel.

A roller of the type with which this invention is concerned is known, as for example, as shown in U.S. Pat. No. 3,105,043 in which the corrugated belts have a zigzag shape and are fastened with their peaks to the straight or flat belts by welding in such a manner that, at each point of connection, one of the straight belts contacts, on both sides, a peak of the adjacent corrugated belts. Thus at each point of connection a plurality of, in the above-described case three, belts lie next to one another so that a peripheral region is produced whose width corresponds to the triple belt thickness. When such a roller is used as a draining roller, these points of connection lead to undesirable marks on the wet paper panel.

A further drawback of these connecting points is that, at the connecting point, the belts of the known roller from acute angle pockets in which slurry and water collect when the rotating draining rollers dips into the wet paper panel. As a result the known roller splashes rather heavily and this produces an undesired washing out or "scooping" of the paper panel.

Finally, in the known roller the relatively large contiguous surfaces of the belts can also have an adverse effect since smaller drops of water at the sides of the belts could form into relatively large drops which would be ejected from the roller and fall onto the wet paper panel. This causes brighter lighter-colored spots to appear on the paper because of the washing out of fine paper material.

SUMMARY OF THE INVENTION

It is therefore the object of the present invention to provide a roller of the above-mentioned type which produces a product of higher quality, i.e. when it is used as a draining roller it permits the production of a uniform paper panel.

In order to accomplish the above-mentioned object and others the present invention provides that, at the connecting points of the flat belts with the corrugated belts, flow-through openings are left between the belts and the woven coating which permit a flow in the peripheral direction. Depending on the particular embodiment of the present invention, the accumulation of water and paper material in the pockets of the roller body is prevented. An additional advantage is achieved in that, at the periphery of the roller body, the wall thickness appears only once, and washing out of the paper panel due to scooping effects, as well as bright spots in the paper which are a result of drops ejected from the roller, are prevented.

Generally, the flow-through openings will be provided at the connecting points between the belts so that the belt thickness at the connecting points appears only once at the periphery of the roller body. This is accomplished in a simple manner in that either the corrugated or straight belts are provided with recesses at the connecting points on their outwardly pointing edges. This construction has the advantage that, except for the area of the flow-through openings, the edges of the straight belts as well as the edges of the corrugated belts extend to the periphery of the roller so that the woven covering is well and uniformly supported everywhere.

The flow-through openings can also be provided if the arrangement is such that either the corrugated belts protrude beyond the straight belts or the straight belts protrude beyond the corrugated belts in the radial direction.

A further improvement according to the invention is that the belts are provided with recesses spaced from their outer edges in order to reduce the belt surfaces. This is important because, with a wide belt width, the accumulation of small water droplets which will tend to form large drops is prevented.

In a construction in which the straight belts protrude beyond the corrugated belts, a ribbed fabric can be fastened to the belts in a simple manner. With the conventional draining rollers, additional fastening rings must be provided to fasten the ribbed fabric while with the construction according to the present invention the straight belts can serve for this purpose. For this reason it is proposed that the straight belts which protrude beyond the corrugated belts be provided with holes near their outer edge for sewing in the screening material or the woven covering, respectively, and that the axial distance of the straight belts from one another is equal to the spacing of the strands of the screening material.

DESCRIPTION OF THE PREFERRED EMBODIMENTS

Figure 1:
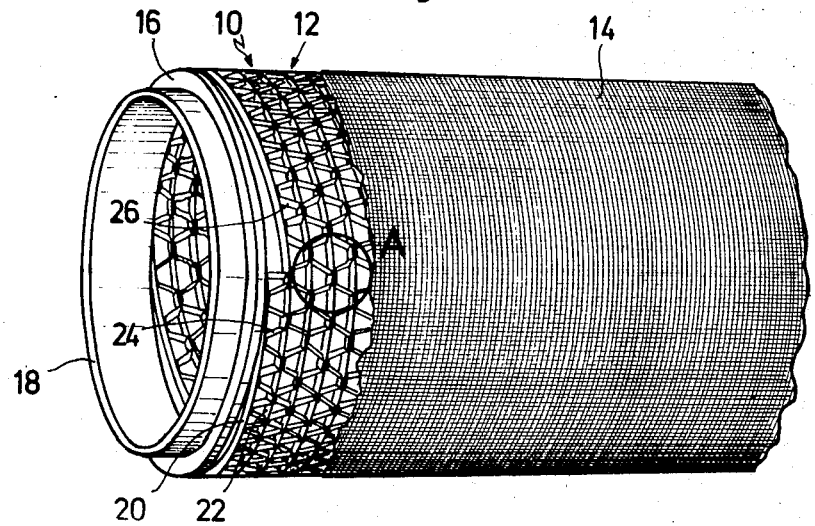
FIG. 1 is a diagrammatic perspective view of a part of a draining roller with which the present invention can be used.

The draining roller shown in FIG. 1 includes a roller body which is generally indicated at 10 and which substantially includes a cylindrical grate, generally indicated at 12, on which a wire sieve 14 is attached. The ends of grate 12 are fastened to end flanges 16 which are each bordered by an annular sleeve 18.

In the embodiment shown in FIG. 1 the grate 12 includes two flat belts 20 and 22 which each form a helix and zigzag or corrugated belts 24 and 26 disposed therebetween. Instead of the flat belts 20 and 22 it is also possible to arrange spaced upright rings next to one another which are then connected together, in the same manner as the helixes formed by the flat belts 20 and 22, by a plurality of zigzag belts which in this case are designed as zigzag rings. For reasons of simplicity only those embodiments of the present invention in which upright and zigzag rings form the grate will be described. However, the configuration of the present invention can be used just as well with a grate as shown in FIG. 1.

Instead of a wire sieve 14 a coarse supporting fabric can be attached to grate 12 and a fine woven covering would be placed over it. However, it is also possible to produce a so-called ribbed draining roller if the cylindrical grate 12 is covered with a so-called ribber fabric.

Figure 2:
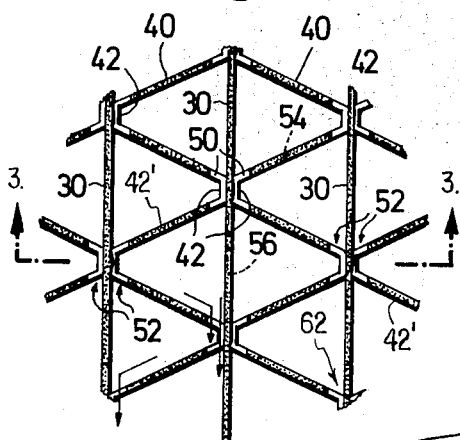
FIG. 2 is a plan view corresponding to the section A shown in dot-dash lines in FIG. 1 of the roller body and an enlarged to show a configuration according to a first embodiment of the present invention.

Such a ribbed fabric is for instance used for producing paper with watermarks; for use of such with the inventive roller it is preferred to connect circumferential rib wires by binding wires exactly on flat upright rings 30, shown in FIG. 2, and to secure the binding wires by suitable means as for instance a wire to these flat upright rings 30.

Ribbed fabrics are for instance disclosed in the following publications: Karl Keim, "Das Papier," published in 1956 by Otto Blersch Verlag, Stuttgart, Germany, page 216; Karl Keim, "Sieb und Filz," published in 1968 by Güntter-Staib Verlag, Biberach, Germany, page 196.

Figure 3:
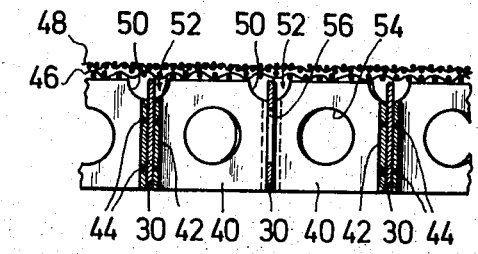
FIG. 3 is a sectional view along the line 3—3 of FIG. 2 which, however, also shows the woven covering.

In FIG. 2 the flat upright rings are marked 30, and the likewise upright zigzag rings are marked 40. The latter contact with their combs 42 the side surfaces of the upright rings 30 to which they are fastened by means of spot welding. FIG. 3 also shows coarse supporting fabric 46 which rests on the outer edges of the upright rings 30 and the zigzag rings 40. A fine woven covering 48 is disposed on top of the supporting fabric.

Figure 4:
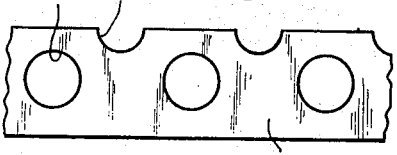
FIG. 4 is a side view of a part of the belt forming the zigzag rings.
Figure 5:
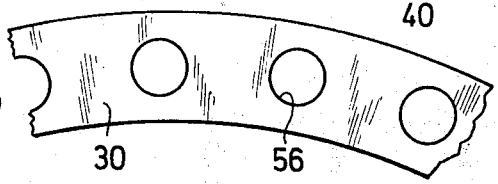
FIG. 5 is a side view of a part of that belt which forms the straight upright rings.

As can be seen in FIGS. 2–4, the zigzag rings 40 are provided with semicircular recesses 50 in the area of their tips or combs 42 along their edge which faces outward when disposed in the grate. These recesses, together with the respective adjacent upright ring 30, form discharge channels, which are generally indicated at 52 in FIG. 2, at both sides of this upright ring. It is thus seen—particularly upon observing FIGS. 2 and 3—that at each location of engagement between a ring 30 and rings 40, the semicircular recess 50 in each ring 40 ensures that of any two directly contacting rings (there are altogether three rings—one ring 30 and two rings 40—in a stack-like contact at each location of engagement) only one ring—ring 30—is in contact with the wire sieve or covering 14. The direction of flow is shown by arrows in the lower left-hand portion of FIG. 2 and will be discussed in detail below.

FIGS. 2–5 further show circular cutouts 54 and 56 in the zigzag rings 40 and the flat upright rings 30, respectively, and these cutouts serve to reduce the surface area of the belts forming these rings.

It should be noted in connection with the embodiment shown in FIG. 2 that at the points where the zigzag rings 40 are connected with the upright rings 30 there is only one belt thickness and this is a result of the recesses 50 in the zigzag rings. Nevertheless the supporting fabric 46 is uniformly supported at every point.

Figure 6:
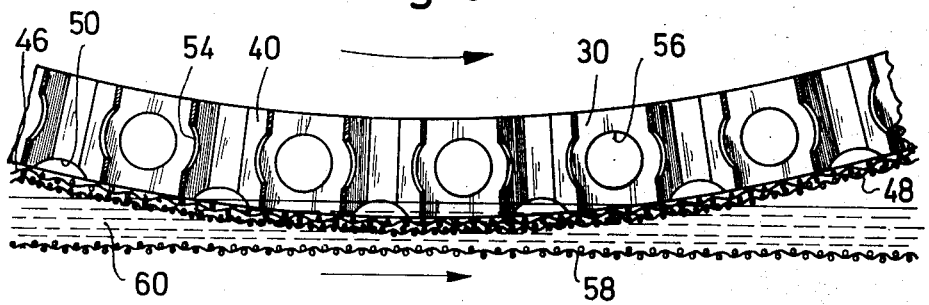
FIG. 6 is a sectional view in a plane perpendicular to the axis of the draining roller which shows a part of this roller which dips into a wet paper panel on a longitudinal sieve.

FIG. 6 shows the use of a draining roller constructed according to the present invention. The roller as used in the appropriate paper making machine, not shown, dips into a paper panel 60 disposed on a sieve 58 in order to equalize and compress the surface of the paper panel. During operation of the draining roller, a mixture of fine paper material and water penetrates through the cylindrical grate 12. If now the zigzag rings 40 and the flat upright rings 30 were to form complete pockets at those locations identified with the reference numeral 62 in FIG. 2, the draining roller would splash considerably and washout of the paper panel would be the result. However, because of the discharge channels 52, the mixture of fine paper material and water can flow out of these pockets. Moreover, the walls 42' of the zigzag rings which are inclined with respect to the longitudinal axis of the roller 10 do not tend to splash as much as do axially parallel walls and the former conduct the mixture of fine paper material and water toward the discharge channels 52.

Figure 7:
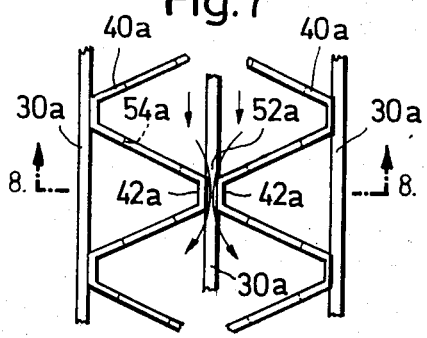
FIG. 7 is a view similar to that of FIG. 2 but showing a second embodiment of the invention.
Figure 8:
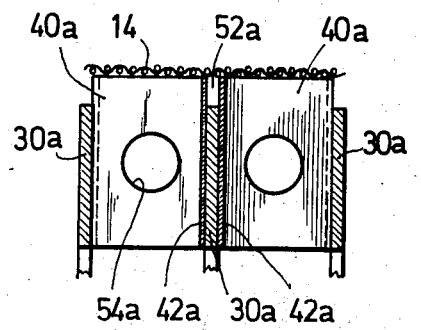
FIG. 8 is a cross-sectional view taken along the line 8—8 of FIG. 7.

In the embodiment according to FIGS. 7 and 8, in which the same reference numerals used in FIG. 2 are retained but with the addition of the letter a, zigzag rings 40a protrude beyond the flat upright rings 30a in radial direction so that discharge channels 52a result between combs 42a. The direction of flow of the mixture of fine material and water is again shown by arrows in FIG. 7. A wire sieve 14, as seen in FIG. 8, is not supported as uniformly as is the case in the first embodiment shown in FIG. 2. But the thickness of the belts forming the rings again appears only once along the periphery of the roller body since the combs 42a are not contiguous.

Figure 9:
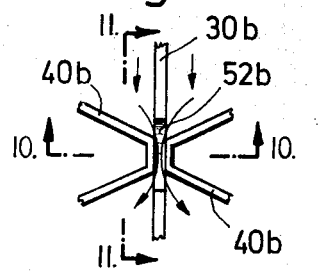
FIG. 9 is also a view similar to that of FIG. 2 showing a third embodiment of the invention.
Figure 11:
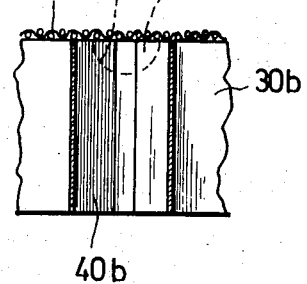
FIG. 11 is a cross-sectional view taken along the line 11—11 of FIG. 9.
Figure 10:
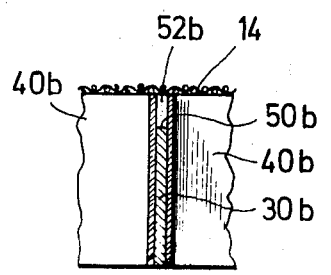
FIG. 10 is a cross-sectional view taken along the line 10—10 in FIG. 9.

In the embodiment according to FIGS. 9, 11 and 10, the discharge channels 52b are formed by cutouts 50b at the outer edge of the flat upright rings 30b. The direction of flow of the mixture of fine material and water is again indicated by arrows in FIG. 9. The wire sieve 14 is supported just as uniformly as in the first embodiment shown in FIG. 2. Again the same reference numerals as used in FIG. 2 are retained, however with the addition of the letter b. It is thus seen—particularly upon observing FIGS. 2 and 3—that each location of engagement between a ring 30 and rings 40, the semicircular recess 50 in the ring 40 ensures that of any two directly contacting rings (there are altogether three rings—one ring 30 and two rings 40—in a stack-like contact at each location of engagement) only one ring—ring 30—is in contact with the wire sieve or covering 14.

Figure 12:
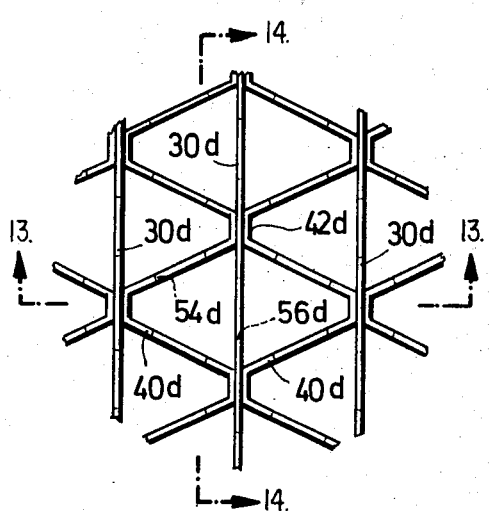
FIG. 12 is a further view similar to that of FIG. 2 showing a fourth embodiment of the invention.
Figure 13:
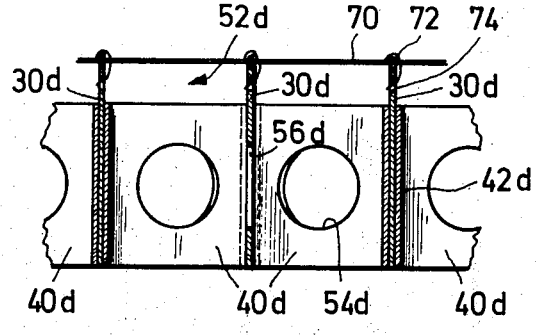
FIG. 13 is a cross-sectional view taken along the line 13—13 in FIG. 12.
Figure 14:
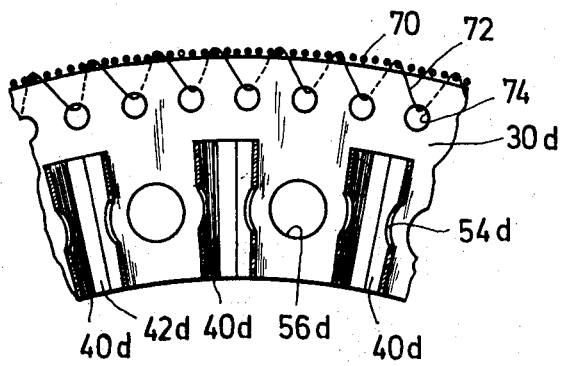
FIG. 14 is a cross-sectional view through this fourth embodiment taken along the line 14—14 of FIG. 12.

A fourth embodiment of the present invention is shown in FIGS. 12, 13 and 14, which show the use of the present invention on a ribbed draining roller. Here the flat upright rings 30d protrude beyond the zigzag rings 40d so that the mixture of fine paper material and water can flow over the outer edges of the zigzag rings. The areas corresponding to the discharge channels 52 are therefore identified as 52d (see FIG. 13). A ribbed fabric 70 is fastened to the roller body by means of a fine wire 72 which is threaded through holes 74 along the periphery of the linear upright rings so that separate fastening rings can be eliminated.

Here again the same reference numerals that were used in FIG. 2 are retained but with the addition of the letter *d*.

It will be understood that the above description of the present invention is susceptible to various modifications, changes and adaptations, and the same are intended to be comprehended with the meaning and range of equivalents of the appended claims.

I claim:

1. In a roller for paper making machines, in which the roller has a cylindrical body having a longitudinal axis and formed, as viewed in a direction parallel to the axis, with a plurality of substantially peripherally extending, axially spaced flat belts oriented edgewise radially with respect to said axis; a plurality of substantially peripherally extending, axially spaced corrugated belts oriented edgewise radially with respect to said axis, said flat and said corrugated belts alternating axially, each corrugated belt extending peripherally in a zigzag fashion between two flat belts and being in engagement therewith along the crests of the corrugation, whereby in the locations of engagement at least a double thickness of belt is formed, each belt having a radially outwardly directed, peripherally extending edge face; and a woven cover enclosing the roller body and in contact with said edge face of each flat and each corrugated belt, the improvement comprising means defining, at each said location of engagement, at least one recess or cutout in at least one of said belts, said cutout being provided in a radially outwardly directed marginal belt zone, said cutout passing through and beyond said location of engagement for leaving, of the belt edges of any two directly contacting belts, solely a single belt edge in contact with said cover at each said location of engagement and for providing a peripheral flow path between said cover and said belts at each said location of engagement.

2. A roller as defined in claim 1, wherein said cutouts are provided in said flat belts.

3. A roller as defined in claim 1, wherein said cutouts are provided in said corrugated belts.

4. A roller as defined in claim 1 wherein there are further means which define a plurality of cut-out areas through said flat and corrugated belts and said cut-out areas are spaced inwardly from the outwardly facing edges of said belts whereby the surface areas of said belts is reduced.

5. A roller as defined in claim 1 wherein there are means defining a plurality of holes in said flat belts, and these holes are disposed adjacent the outwardly facing edges of said belts.

6. A roller as defined in claim 5, further comprising means disposed between said holes and said woven cover to secure said woven cover to said flat belts.

References Cited

UNITED STATES PATENTS

| | | | |
|---|---|---|---|
| 3,105,043 | 9/1963 | Rich et al. | 210—402 |
| 3,445,905 | 5/1969 | Spencer | 29—121 R |
| 3,081,821 | 3/1963 | Hamilton | 162—357 |

S. LEON BASHORE, Primary Examiner

R. V. FISHER, Assistant Examiner

U.S. Cl. X.R.

29—121 R; 162—372; 210—402